Oct. 16, 1934.    R. STADLER ET AL    1,977,155
CARRYING OUT CHEMICAL REACTIONS BETWEEN GAS LIKE SUBSTANCES
Filed July 26, 1930
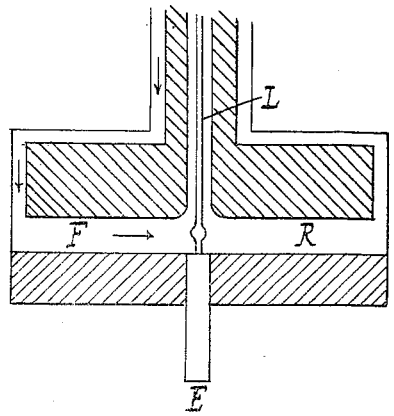
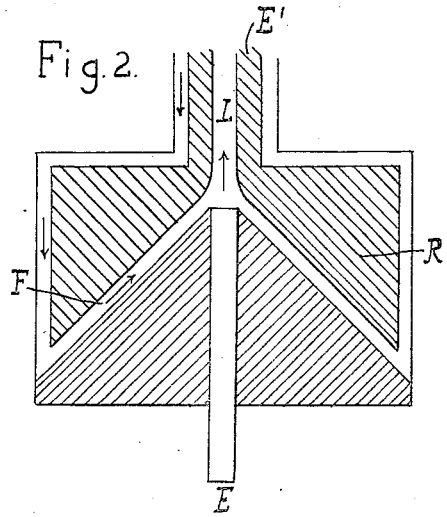
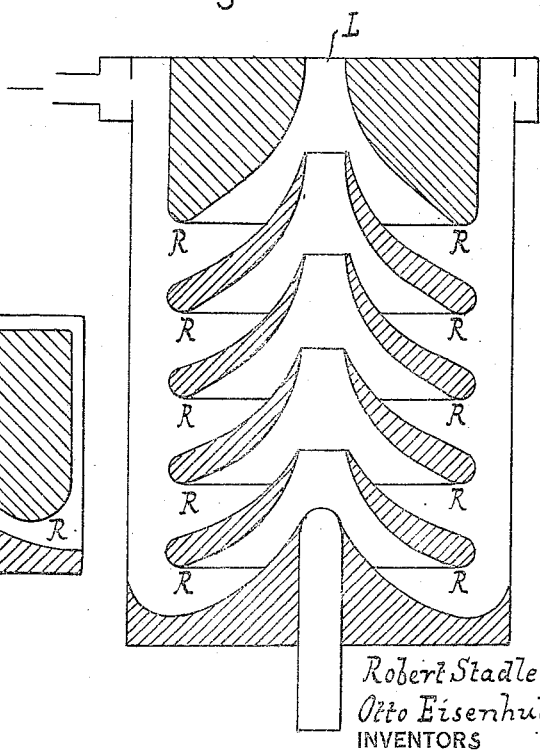
Robert Stadler
Otto Eisenhut
INVENTORS
BY
ATTORNEYS Patented Oct. 16, 1934

1,977,155

UNITED STATES PATENT OFFICE 1,977,155

CARRYING OUT CHEMICAL REACTIONS BETWEEN GAS-LIKE SUBSTANCES

Robert Stadler, Ziegelhausen-on-the-Neckar, and Otto Eisenhut, Heidelberg, Germany, assignors to I. G. Farbenindustrie Aktiengesellschaft, Frankfort-on-the-Main, Germany Application July 26, 1930, Serial No. 471,070
In Germany August 30, 1929

2 Claims. (Cl. 204—31)

The present invention relates to the carrying out of chemical reactions between gas-like substances, namely gases, vapours, mists or suspensions in gases of solid or liquid substances and the like with the aid of electrical discharges, as for example electric arc discharges and silent discharges, whereby, especially when working with large units, the movement of the substances exposed to the electric discharges is to a large extent freed from the turbulent side currents, otherwise always present, by special arrangement of the parts of the apparatus so that a practically pure parallel current is produced. We have found that this is effected by leading the substances to be treated into the region of discharge in a smooth non-turbulent state of motion. This may be effected by passing them directly before their entry into the region of the discharges, through chambers of such shape and dimensions that the turbulent side currents are practically destroyed.

It has always been attempted hitherto to make the path of the gases and the like from their entry into the discharge apparatus, as for example the electric arc furnace, to their entry into the electric arc itself as short as possible. In this case, however, the whole of the currents of gas and the like are always disturbed by turbulent side currents which give rise to numerous objections during the reaction. For example, when working up gases containing hydrocarbons, injurious increases in pressure take place which result in undesirable further conversions of the reaction products formed, especially the formation of carbon.

The manner of working according to the present invention may be advantageously employed for various reactions, as for example for the production of oxygen and hydrogen from steam or for the oxidation of sulphur dioxide to form sulphur trioxide or for the production of cyanic acid.

The chamber or chambers arranged according to the present invention in front of the region of the discharges to prevent turbulence may have numerous shapes.

The nature of this invention will be further described with reference to the accompanying drawing which shows four arrangements of apparatus according to this invention, but the invention is not restricted to these arrangements.

In all the figures L is the discharge chamber proper, E and E' are the electrodes, R the chamber provided to prevent turbulence and F the walls thereof. Figure 1 illustrates an arrangement of apparatus in which the chamber R provided directly in front of the discharge is bounded by at least one surface F perpendicular to the axis of the discharge and having an area at least four times, preferably more than ten times, as large as the area of cross-section of the slightly conical or (as shown in the drawing) cylindrical discharge chamber.

In Figures 2 and 3 the antechamber has a conical or curved shape.

As shown in Figure 4 it is possible to provide several arrangements along the discharge chamber and care must be taken by correct shaping of the inlet openings, nozzles and the like that no new turbulence phenomena appear when combining the gas currents.

The effect of the apparatus according to the present invention is obviously that, for example the electric arc will burn quite quietly in the axis and assume the uniform shape shown for example in Figure 1, whereas in electric arc furnaces of the known kind the arc does not burn quietly but deviates from the axis and its boundary is irregular and scattered.

Contrary to expectation it is possible by such precautions for obtaining a uniform flow to obtain extremely valuable technical effects. On the one hand it is possible favourably to regulate the absorption of energy of the discharge and on the other hand the chemical process may be influenced.

When working with apparatus according to the present invention the electrical energy absorbed is increased so that the tension is increased while the current strength is simultaneously decreased. It is immaterial which kind of current is employed; the phenomenon takes place with stationary direct current, pulsating or intermittent direct current or rectified alternating current and also with alternating current of different frequencies and curves. If the discharge, as for example the electric arc, be fed with an alternating current, if desired while rectifying, the power factor is improved.

Moreover, the expenditure of energy per kilogram, of reaction products formed is appreciably decreased.

Even when employing preheating of the materials to be treated, the turbulent movements impair the preheating effect, so that this, at a preheating temperature of about 500° C., only amounts to about 5 per cent. According to the present invention, at the same preheating temperature, an effect of 10 per cent and more may be attained, whereby the expenditure of energy for the product to be prepared, as for example acetylene from methane in the electric arc, is appreciably reduced.

Moreover, for example in the said reaction, a prior decomposition of hydrocarbons into carbon and hydrogen is prevented.

Finally, the formation of undesirable reaction products is repressed in favour of that of desirable products. Thus for example with an ordinary electric arc furnace a gas containing 7.5 per cent of unsaturated hydrocarbons is obtained in the preparation of acetylene from methane. The content of acetylene amounts to 5.8 per cent. Under the same conditions, but when working according to the present invention the content of acetylene increases to 6.8 per cent. The content of acetylene is thus considerably greater, namely by 17.3 per cent.

The following examples will further illustrate the nature of this invention, but the invention is not restricted thereto.

*Example 1*

A waste gas obtained from the destructive hydrogenation of coal, containing 30 per cent of methane and homologues thereof gives rise to considerable formation of carbon black when subjected to an electric arc formed between a cylindrical electrode and a tubular electrode having the same axis, so that the gases leaving the arc are very dim. Besides this also the content of acetylene of the resulting gas is very changing and reaches at best 7 per cent. When, however, passing the said gas with a velocity of flow of about 200 metres per second through an electric arc having a voltage of 3000 volts and burning in a furnace as illustrated in Figure 1 of the accompanying drawing the process becomes very uniform and the concentration of acetylene of the resulting gas increases to 10 per cent. In this case no formation of carbon black can be noticed.

*Example 2*

In the production of nitric acid from air by means of an arc produced in an ordinary Schönherr furnace by an alternating current having a voltage of 3500 volts from 68 to 70 grams of nitric acid are obtained per kilowatt hour. If, however, a furnace as illustrated in Figure 4 of the accompanying drawing is employed the yield in nitric acid increases to from 75 to 76 grams per kilowatt hour.

What we claim is:—

1. An apparatus for carrying out chemical reactions with gas-like substances which comprises an arc chamber, a second chamber in front of, and having the same axis as, said arc chamber, said second chamber being bounded by two surfaces having an unbroken generatrix which forms from a right to an acute angle with the axis of said arc, each of the said surfaces having an area at least ten times as large as the cross-sectional area of the arc space, thereby introducing said substances into the arc in a smooth non-turbulent state of motion.

2. An apparatus for carrying out chemical reactions with gas-like substances which comprises an arc chamber, a second chamber in front of, and having the same axis as, said arc chamber, said second chamber being bounded by two conical surfaces having an unbroken generatrix which forms an acute angle with the axis of said arc, each of the said surfaces having an area at least ten times as large as the cross-sectional area of the arc space, thereby introducing said substances into the arc in a smooth non-turbulent state of motion.

ROBERT STADLER.
OTTO EISENHUT.